April 2, 1935.  H. H. STYLL  1,996,085
OPHTHALMIC LENS
Filed Dec. 27, 1932    2 Sheets-Sheet 1
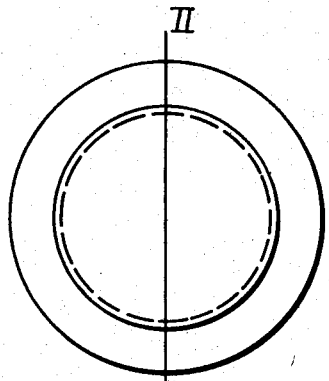
FIG. I
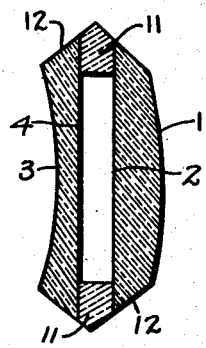
FIG. II
   
FIG. III  FIG. IV  FIG. V  FIG. VI  FIG. VII
   
FIG. VIII  FIG. IX  FIG. X  FIG. XI
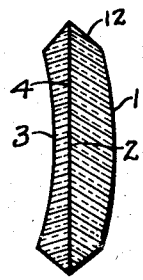 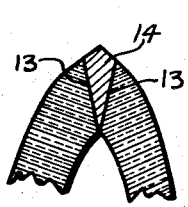 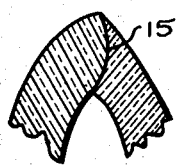 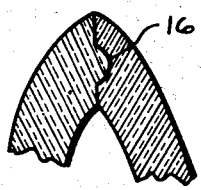
FIG. XII  FIG. XIII  FIG. XIV  FIG. XV
Harry H. Styll  INVENTOR April 2, 1935. H. H. STYLL 1,996,085
OPHTHALMIC LENS
Filed Dec. 27, 1932  2 Sheets-Sheet 2
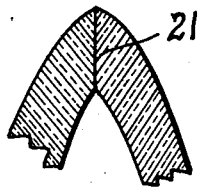
FIG.XVI
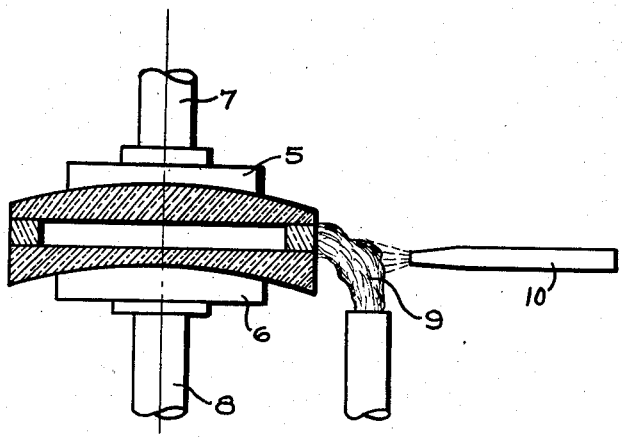
FIG.XVII
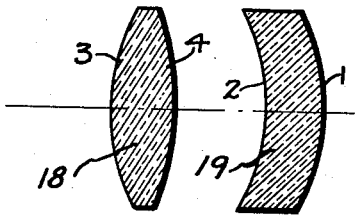
FIG.XVIII
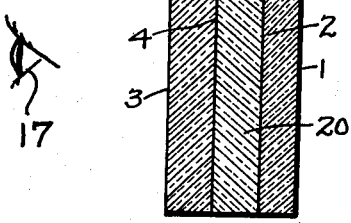
FIG.XIX
Harry H. Styll INVENTOR Patented Apr. 2, 1935

1,996,085

UNITED STATES PATENT OFFICE 1,996,085

OPHTHALMIC LENS

Harry H. Styll, Southbridge, Mass., assignor to American Optical Company, Southbridge, Mass., a voluntary association of Massachusetts Application December 27, 1932, Serial No. 648,968

8 Claims. (Cl. 88—54)

This invention relates to improvements in lenses and to an improved process of making the same.

One of the principal objects of the invention is to provide an improved composite lens adapted not only to provide for refractive corrections in cylinder, sphere and prism as have been provided in lenses of the past but that will provide in addition for a change in magnification of the image without a change in focus wherein the parts of said lens are secured together and also to provide an improved process for securing these results.

Another object of the invention is to provide an improved lens of this character and process for making the same which lens has more than two refractive lens faces so constructed as to have the appearance of a single lens and so that it may be mounted as though it were a single lens.

Another object of the invention is to provide an improved process of making a lens of this character having more than two lenticular faces so that the parts may be fused together to unite the parts into a unitary lens structure.

Another object of the invention is to provide an improved compound lens of this character and process for making the same wherein the axes of the lens elements may be accurately matched one with the other in desired relation and separation and the parts fused together to hold this relation and to unite them into a unitary structure.

Another object of the invention is to provide a compound lens of this character and process of making the same wherein the lens elements have any desired combination and relationship of surfaces and separation and wherein such elements are fused together into a unitary structure.

Another object of the invention is to provide improved means for uniting the edges of the lens elements of a compound lens of this character.

Other objects and advantages of the invention will become apparent from the following description taken in connection with the accompanying drawings. It will be apparent that many changes may be made in the arrangement of parts and details of construction and steps of the process without departing from the spirit of the invention as expressed in the accompanying claims the preferred forms only having been shown and described by way of illustration. I therefore do not wish to be limited to the exact forms and steps shown and described.

Referring to the drawings:

Fig. I is a front view of a lens embodying the invention.

Fig. II is a cross section on line II—II of Fig. I.

Figs. III to XI inclusive are diagrammatic cross sectional views showing the character and relationship of the inner lens surfaces of various modifications of the invention.

Fig. XII is a cross section similar to Fig. II wherein the inner surfaces of the lens elements are not separated but abut each other.

Figs. XIII to XVI inclusive are partial cross sections showing different methods of uniting the edges of the lens elements.

Fig. XVII is a partial diagrammatic view partially in cross section showing a method of fusing the edges of the lens elements together.

Fig. XVIII is a cross section through a compound lens having one lens element carrying the optical corrections for cylinder, sphere and prism, one, singly, or two, or three, combined and the other lens element carrying the optical correction for change in magnification of the first element without change of focus thereof, and Fig. XIX is a cross section of a compound lens comprising two outer lens elements with a uniting medium between them, the said lens including optical corrections for cylinder, sphere and prism, one, two, or all, and also an optical correction for change in magnification without change in focus of the other correction or corrections.

In the past great difficulty has been experienced in the art in matching the axes of the two surfaces of a lens, particularly where one or both of said surfaces had a difference in curvature in its two major meridians such as toric or cylindrical surfaces and especially in bi-cylinder or bi-torics. If the axes were not matched properly the lens was wasted, being unfit for use. This made this type of lens very expensive. In more recent years an additional correction has been added to eye corrective lenses and there was no place left for it in the single lens. The previous corrections had embraced both cylindrical and spherical corrections, the cylinder being on one side, the sphere on the other and prismatic correction was obtained by decentration. The new correction was one that changed the magnification without changing the focus, put in to correct for a difference of magnification in the two eyes or a difference in magnification in the two meridians of a single eye, etc. This was obtained by putting the magnification in a separate lens aligned with the lens covering the spherical, cylindrical and prismatic corrections. This compound, unconnected lens was bulky and unsightly.

Its appearance was such as to make it impracticable for wear. It was also extremely difficult and expensive to mount, requiring special and unsightly mountings. The principal objects of my invention are to overcome these disadvantages and to provide simple, efficient and economical means for providing against them.

Referring to the drawings wherein similar reference characters denote corresponding parts throughout: In Figure XVIII I have shown an elementary lens of two parts designed to change the size of image without change of power. The eye is shown at 17. The element 18 is the ordinary prescription lens having the surfaces 3 and 4 designed in the usual prior art way for corrections of sphere, cylinder and prism, one, all or any. The element 19 is the element that provides the change in size of image without change of power. It has the surfaces 1 and 2 arranged as follows:

The relationship of the surfaces 1 and 2 is such as to provide no optical power but a magnification. These surfaces may be flat, spherical, aspherical or cylindrical. The amount of change in size depends upon the curvatures of the two surfaces and the thickness of the element. Where change in size of the two major meridians is desired spherical surfaces are used; when change in one meridian only is desired cylindrical surfaces are used. Such a lens element as is well known produces size change without power change. In such a lens element the two surfaces in order to produce no optical power are nearly concentric or substantially equal. The explanation of this is that in the practical range of ophthalmic lenses equal surfaces and concentric surfaces are substantially alike. An infintely thin lens with equal surfaces produces no power, but increase of thickness does produce some power but in the practical range of ophthalmic lenses it is very small and a very small alteration of a surface will compensate the thickness, as for example, a lens 3 mm. thick having a 6 diopter front surface would have a 6.07 diopter rear surface for no power, hence, by substantially equal surfaces and nearly concentric surfaces is meant herein surfaces that will produce no power with the desired thickness.

When the concave side of the element is placed nearest the eye the size of image is increased, when the convex side of the element is nearest the eye, the size of the image is decreased. The desired change in size is obtained by the relationship of the two surfaces of the element and the thickness thereof by well understood optical rules. The magnification in a no optical power element is due to the bending or curving of the element. If an object is viewed through a plane parallel, the effect of this plane parallel is negligible. If, however, we bend the plane parallel as happens when it is ground on different base curves, a magnification will be produced. The element is so curved or bent to give desired magnification.

For description of lenses of this nature see article entitled "Lenses for changing the size and shape of dioptric images" by Ames, Glidden and Ogle of the department of research in physiological optics, Dartmouth Medical School, Hanover, New Hampshire, contained in a pamphlet reprint from The Annals of the Distinguished Service Foundation of Optometry, Boston, Massachusetts, 1932, page 27.

The faces 1, 2, 3, and 4 may be of any desired flat or curved lens surface such as plano, concave, convex, spherical, cylindrical, toric, aspherical, flat prism, curved prism and toric prism etc. The surfaces 1, 2, 3, and 4 are ground and polished to required surface in the usual prior art way.

After the various surfaces of the lens elements have been prepared they are assembled as shown in Fig. II and Fig. XII. The inner surfaces 2 and 4 may abut each other as shown in Fig. XII or they may be separated as shown in Fig. II. The separation of the lens elements depends on the focus and magnification required in the composite lens.

The outline shape of the lens may be any desired or required configuration such as circular, oval, drop eye or other shape.

In making the lens of Fig. XII the faces 2 and 4 are abutted one against the other and the two elements turned until their axes are in desired relationship one with the other. The two elements are then clamped or secured together by cementitious means or otherwise and placed in the clamps 5 and 6 of Fig. XVII. These clamps have the axle rods 7 and 8 respectively. These axle rods are rotatably mounted in suitable supports not shown so the clamped lens elements may be rotated as a whole. Adjacent the edge of the lens elements a suitable torch flame 9 is arranged, being sufficient to produce the necessary heat to fuse the edge parts of the lens elements together. The flame 9 is blown against the edge of the lens elements by the blow pipe 10. The lens elements are revolved on the axles 7 and 8 until the edges of the lens elements are uniformly melted together. Then the heat is removed, the parts annealed and allowed to cool. Other methods of applying the heat to the edges of the lens elements such as an electric furnace may be utilized instead of the blow pipe method as described.

The parts of Fig. XII may be also if desired fused together face to face on the faces 2 and 4. In this operation one part is laid on a refractory block, the other part superimposed on the first part, the two desired surfaces 2 and 4 being placed face to face. The assembled parts are then placed in a furnace and the two lens elements fused together in the usual prior art method.

In making the compound lens of Fig. II the process is the same except that a separator member 11 of soft glass, or suitable flux is placed between the lens elements. This separator is of the thickness designed to produce a separation of the lens elements necessary to give the required focus or the necessary magnification required. The parts are fused together as described above, the axes having been related as described above.

After the lens elements have been fused together the composite lens thus made is bevelled at the edge to fit a lens holding mounting in the usual way. This bevel is indicated at 12.

The edge butts may be formed in various ways. In Fig. XIII the edges of the two elements are bevelled back at 13, and a filler plug 14 inserted between the surfaces 13. This plug may be a soft glass or flux that fuses easily. In Fig. XIV the abutting edges 15 are a concavo-convex match. In Fig. XV the abutting edges 16 are a tongue and groove fit, and in Fig. XVI the abutting edges 21 are a plane fit. Various modifications may be made in these edges, the main consideration being to provide a joint that is readily fused and to which it is easy to apply the fusing heat.

In Figs. III to XI inclusive various combinations and relationships of the inner surfaces of the lens elements are indicated: parallel, double concave, plano concave, plano convex, concavo convex, double convex, etc.

The supports 11 may be clear or colored, as desired, and the lens elements may be clear glass or colored glass, as desired. One may be clear, the other colored, or each may be of a different shade.

The lens surfaces are ground and polished in the usual way. The fusing portions of the lens elements may be either gray or unpolished or polished, as desired, to provide best fusing.

In the form of lens indicated in Fig. II it is apparent that there are four lens faces, which doubles the number of such faces as compared with a single lens. This extra lens surface space makes it possible to add the correction for magnification in addition to the correction for sphere, cylinder and prism. This arrangement also provides a simple and inexpensive way for placing the axes of the two lens elements in desired relation. The lens when completed has all the appearances and advantages of a unitary lens structure.

Instead of beveling the edges as at 11 the lens may be ground off to fit the frame on an edge grinding machine in the ways now utilized to edge simple single lenses, and particularly for thick lenses in the same manner as thick single lenses or cataract lenses.

The finished structure is unitary and it may thus be handled and mounted just as any single lens is done.

The correction for change in magnification without change in focus may be made in only one of the lens elements as shown in Fig. XVIII wherein the surfaces 1 and 2 are shaped to take care of the magnification, and the surfaces 3 and 4 to take care of the corrections for cylinder, sphere or prism, one, both, or all. This correction may also be taken care of in the compilation of all the surfaces 1, 2, 3 and 4, or in any desirable combination of these as found most expedient and economical, different procedures being followed for different powers of lenses, wherein shape, thickness and other characteristics are taken into account. The object is to obtain the best lens for any power with the desired magnification included therein.

In Fig. XIX I have provided a compound lens having one element with the surfaces 1 and 2 and a second element having the surfaces 3 and 4. These two elements are separated and a filler piece 20 of a refractive medium different from the medium of the other two elements placed between them. The object is to provide a relationship of the lens elements with the filler piece wherein the relationship is such as to make the filler piece the equivalent of air in its refractive effect. As for example, I may make the element having the surfaces 3 and 4 of flint glass having a refractive index of 1.7, the other element of flint glass with refractive index of 1.7 and the filler piece of crown glass of refractive index 1.5. To obtain this relationship the curves on the lens elements, particularly the inner curves are modified so that taken in conjunction with the refractive index of the filler piece, the equivalent of an air space between the lens elements is obtained by the usual methods in optical computations using the index of the filler instead of the index of air for the separator.

In making this lens one of the lens elements is laid on a refractory block with the inner surface up, the filler piece is laid on the element, the assembled parts put in a furnace and the glass parts fused together in the usual way; then the second element is fused to the filler piece in a similar way. The lens then may be surfaced, cut, and bevelled in the usual way for mounting.

It will be seen that this produces a unitary composite lens into which the correction for magnification has been introduced. The surfaces and the character of glass of the parts may be modified and changed to meet the best conditions for the lens desired.

In Fig. XVIII the lens element having the surfaces 1 and 2 as stated above is the element that introduces the change of magnification without change of focus. The general law of such lenses is that if a lens having nearly concentric or substantially equal surfaces is placed before the eye with the concave side nearest the eye the object will appear larger but there has been no change of focus, whereas if the convex side is placed nearest the eye the image will be reduced in size without change of focus.

It will be understood that the lens elements may be made of glasses of any desired indices of refraction and that the said elements may be secured together by uniting their entire peripheral edges or by uniting the said edges only at a few selected spots. This uniting depends largely upon the shape and curvatures of the elements.

From the foregoing it will be seen that I have provided simple, efficient and economical means and processes for carrying out all the objects of the invention and obtaining its advantages.

Having described my invention, I claim:

1. A lens comprising a plurality of lens elements superimposed one over the other, both of said elements having optical surfaces on their two faces and the lens system of said superimposed elements being optically equivalent to a lens composed of two units, one of said units having surfaces on its two sides of substantially the same curvature and deflected or bent from a flat plane by an amount to produce a required magnification, and having substantially no optical power, and the other of said units having optical surfaces of different curvatures on its two faces by an amount to produce a required focal power, the bending away from a flat plane of said superimposed elements being different from the bending away from a flat plane of a lens having the same focal power but no magnification, whereby the required magnification is introduced into the lens and said superimposed elements being fitted and secured together to produce a unitary lens structure.

2. A lens comprising a plurality of lens elements superimposed one over the other, both of said elements having optical surfaces on their two faces and the lens system of said superimposed elements being optically equivalent to a lens composed of two units, one of said units having surfaces on its two sides of substantially the same curvature and deflected or bent from a flat plane by an amount to produce a required magnification, and having substantially no optical power, and the other of said units having optical surfaces of different curvatures on its two faces by an amount to produce a required focal power, the bending away from a flat plane of said superimposed elements being different from the bending away from a flat plane of a lens having the same focal power but no magnification, whereby the required magnification is introduced into the lens and said superimposed elements being fitted and secured together adjacent their marginal edges to produce a unitary lens structure.

3. A lens comprising a plurality of lens elements superimposed one over the other, both of said elements having optical surfaces on their two faces and the lens system of said superimposed elements being optically equivalent to a lens composed of two units, one of said units having surfaces on its two sides of substantially the same curvature and deflected or bent from a flat plane by an amount to produce a required magnification, and having substantially no optical power, and the other of said units having optical surfaces of different curvatures on its two faces by an amount to produce a required focal power, the bending away from a flat plane of said superimposed elements being different from the bending away from a flat plane of a lens having the same focal power but no magnification, whereby the required magnification is introduced into the lens and said superimposed elements being abutted and secured together adjacent their marginal edges to produce a unitary structure.

4. A lens comprising a plurality of lens elements superimposed one over the other, both of said elements having optical surfaces on their two faces and the lens system of said superimposed elements being optically equivalent to a lens composed of two units, one of said units having surfaces on its two sides of substantially the same curvature and deflected or bent from a flat plane by an amount to produce a required magnification, and having substantially no optical power, and the other of said units having optical surfaces of different curvatures on its two faces by an amount to produce a required focal power the bending away from a flat plane of said superimposed elements being different from the bending away from a flat plane of a lens having the same focal power but no magnification, whereby the required magnification is introduced into the lens and said superimposed elements having a portion of their adjacent surfaces fitted and secured together.

5. A lens comprising a plurality of lens elements superimposed one over the other, both of said elements having optical surfaces on their two faces and the lens system of said superimposed elements being optically equivalent to a lens composed of two units, one of said units having surfaces on its two sides of substantially the same curvature and deflected or bent from a flat plane by an amount to produce a required magnification, and having substantially no optical power, and the other of said units having optical surfaces of different curvatures on its two faces by an amount to produce a required focal power, the bending away from a flat plane of said superimposed elements being different from the bending away from a flat plane of a lens having the same focal power but no magnification, whereby the required magnification is introduced into the lens and said superimposed elements having a portion of their adjacent edges secured together.

6. A lens comprising a lens element having optical surfaces on its two faces of substantially the same curvature, said element having substantially no optical focal power, a lens element having curved optical surfaces on its two faces, said surfaces being substantially different in curvature and having focal power, said two elements being aligned one with the other with their adjacent surfaces separated by a distance to give the required optical properties of the two elements, and a filler piece of optical glass filling the marginal space between the elements but not the central portion thereof.

7. A lens comprising a lens element having optical surfaces on its two faces of substantially the same curvature, said element having substantially no optical focal power, a lens element having curved optical surfaces on its two faces, said surfaces being substantially different in curvature and having focal power, said two elements being aligned one with the other with their adjacent surfaces separated by a distance to give the required optical properties of the two elements, and a filler piece of optical glass filling the marginal space between the elements but not the central portion thereof, said filler piece being extended beyond the margin of the edges of said two elements.

8. A lens comprising a plurality of lens elements superimposed one over the other, both of said elements having optical surfaces on their two faces and the lens system of said superimposed elements being optically equivalent to a lens composed of two units, one of said units having surfaces on its two sides of substantially the same curvature and deflected or bent from a flat plane by an amount to produce a required magnification and having substantially no optical power, and the other of said units having optical surfaces of different curvatures on its two faces by an amount to produce a required focal power, but neither of said elements actually having surfaces on its two sides of substantially the same curvature, the bending away from a flat plane of said superimposed elements being different from the bending away from a flat plane of a lens having the same focal power but no magnification, whereby the required magnification is introduced into the lens and said superimposed elements being positioned and held in required related position to each other.

HARRY H. STYLL.